US006559558B2

(12) United States Patent
Quesnel et al.

(10) Patent No.: US 6,559,558 B2
(45) Date of Patent: May 6, 2003

(54) SMART CAR STARTER

(76) Inventors: Gary E. Quesnel, 9456 Woodlawn Dr., Brewerton, NY (US) 13029; Domenick Losurdo, 2788 Lyons Rd., Camillus, NY (US) 13031

( * ) Notice: Subject to any disclaimer, the term of this patent is extended or adjusted under 35 U.S.C. 154(b) by 172 days.

(21) Appl. No.: 09/754,416

(22) Filed: Jan. 3, 2001

(65) Prior Publication Data

US 2002/0084694 A1 Jul. 4, 2002

(51) Int. Cl.[7] .................................................. H02G 3/00

(52) U.S. Cl. ........................ 307/10.6; 307/9.1; 340/5.6; 340/5.64; 340/5.72; 180/167

(58) Field of Search ................................ 307/10.6, 9.1; 340/5.6, 5.64, 5.72; 180/167

(56) References Cited

U.S. PATENT DOCUMENTS

| | | | | | |
|---|---|---|---|---|---|
| 3,985,982 | A | | 10/1976 | Schneidinger | 200/33 R |
| 4,080,537 | A | | 3/1978 | Bucher | 290/38 R |
| 4,598,209 | A | * | 7/1986 | Garlinghouse | 290/38 |
| 4,835,413 | A | | 5/1989 | Nilssen | 307/141 |
| 4,912,376 | A | | 3/1990 | Strick | 315/362 |
| 5,016,025 | A | | 5/1991 | Wyss | 346/14 MR |
| 5,024,186 | A | | 6/1991 | Long et al. | 123/179 B |
| 5,306,957 | A | | 4/1994 | Ellingham et al. | 307/141 |
| 5,464,953 | A | | 11/1995 | Kim | 200/33 R |
| 5,656,868 | A | | 8/1997 | Gottlieb et al. | 307/10.6 |
| 5,719,362 | A | | 2/1998 | Gray, Jr. | 200/38 R |
| 5,828,018 | A | | 10/1998 | Cooper | 200/33 R |
| 5,955,796 | A | * | 9/1999 | Nilssen | 307/140 |
| 5,990,785 | A | * | 11/1999 | Suba | 340/426 |
| RE36,437 | E | * | 12/1999 | Hanson et al. | 123/179 |

* cited by examiner

*Primary Examiner*—Brian Sircus
*Assistant Examiner*—Robert L DeBeradinis
(74) *Attorney, Agent, or Firm*—Brown & Michaels, PC

(57) ABSTRACT

A housing for a remote car starter that activates such starter at pre-set times of the day, and/or in response to a telephonically-originated message, comprises a cavitated area, an activation panel, a servomotor, and a timer and/or a dial-up sub-unit. The user places the transmitter of an existing remote car starter into the housing, places pins into the hole(s) opposite the start button(s) of the remote car starter, closes the housing and places the housing into the glove box or trunk of the car. The activation panel contains a series of holes arranged in two-dimensional fashion for positioning one or more pins opposite the transmitter's button or other activator. The timer includes means for setting at least one time of day for the timer cause activation of the servo-motor. In the dial-up embodiment, the dial-up sub-unit functions in manner similar to conventional beepers: a telephonically-originated message causes it to activate the servomotor. When the timer is activated, or the dial-up sub-unit receives an activation message, as the case may be, the servomotor is activated, which causes depression of the activation panel, thus causing the pin(s) in such panel to come into contact with, and depress, the transmitter's activation button, which causes the car's engine to start. In an alternate embodiment, the device learns the signal from the transmitter, and either at pre-set time(s) of the day or in response to a telephonically-originated message, emits such learned signal to cause the car to start.

34 Claims, 5 Drawing Sheets

SMART CAR STARTER

BACKGROUND OF THE INVENTION

1. Field of the Invention

The invention pertains to a device to activate a remote car starter when out of range of the starter's receiver unit. More particularly, the invention pertains to a housing for a remote car starter that activates such a starter at one or more pre-set times of the day, or on demand.

2. Description of Related Art

Many individuals commute by car to and from work at substantially the same time every day. During seasons when the weather is hot or cold, and especially when snow or ice has accumulated on the car, it is helpful for such individuals to start their cars, say, ten minutes before leaving the office. Remote automobile starters are known in the art. Their use allows the car in which they are installed to be started remotely so as to warm up inside, or cool down inside, as the case may be, by the time the operator arrives at the car and enters its interior. If snow or ice has built up on the car, remote car starters also allow the snow or ice to melt and run off by the time the operator is ready to begin driving. Finally, such devices allow the engine to reach normal operating conditions before it is moved, without requiring the operator to sit idle in the car for a period of time.

Remote automobile starters employ, inside the car, a device activated by receiving a command signal from a remote transmitter operated by the user, the receiver in turn generating signals to control, via circuitry coupled to the vehicle's wiring, operation of the vehicle's starting system. See, e.g., Bucher, U.S. Pat. No. 4,080,537, Remote Starting System For A Combustion Engine (1978); Garlinghouse, U.S. Pat. No. 4,598,209, Remote Control Engine Starter (1986); Long et al., U.S. Pat. No. 5,024,186, Remote Automobile Starter, (1991); Gottlieb et al., U.S. Pat. No. 5,656,868, Remote Vehicle Starter For A Standard Transmission Vehicle (1997).

The transmitter portion of the remote car starters exemplified by the above-cited references is carried by the driver in his or her pocket, perhaps on a key chain. When the driver wants the car to start remotely, he or she pushes a button on the transmitter, which causes the latter to transmit, via radio frequency emissions, a command to the receiver portion to start the motor. The receiver portion receives the command and responds by causing the car to start as described above. The driver typically pushes such transmitter button an appropriate interval of time, such as ten minutes, prior to the time he or she anticipates arriving at the vehicle.

There are at least two difficulties with this prior-art approach. First, the driver may forget to activate the starter at the right time, or may be unaware of the time of day, especially if he or she is concentrating on work, or on getting ready to leave for work, as the case may be. Additionally, in many instances the driver must park a fair distance away from his or her office, shop floor, or other work site, out of the range of the remote starter. Hence, even if the driver remembers to activate the transmitter at the appropriate time prior to leaving work, he or she must run out into the hot or freezing cold weather, half way across the parking lot, until the remote starter is in range of the car and, only then, press the transmitter button to cause the car to start. This has made for an unseemly spectacle observed by the inventors at some work sites, in which a number of factory workers have been seen running half-way across the parking lot in inclement weather, only to push a button and run back inside the factory.

Due to the above limitations of the prior art, there is a need for a device to automatically start a car at pre-set times of the day, or on demand, without the driver having to be in range of the remote starter. The user of such a device should be able to set one or more times of day when the car will start automatically. Further, because of the large existing base of remote car starters deployed to customers, the device should work in tandem with existing starters, rather than replace them. Such would reduce the cost of manufacturing, as the device would not have to contain transmitters, receivers or car-starting circuitry. To be most readily acceptable to a user, there should be no need for the device to be installed anywhere on the car. This is particularly important because installation can be costly and can cause the vehicle to be tied up for several hours. The need for installation also introduces the non-trivial probability of installation errors.

In addition to the above, there is a need for an embodiment in which the remote starter is responsive to a user's signal that is originated telephonically from a remote location. Such embodiment is particularly useful when the user's plans change so that remote starting of the car is needed at other than pre-set times of the day, or when the user is unable to predict when remote starting of the car will be desired.

SUMMARY OF THE INVENTION

An apparatus solving the above-described problems comprises a container for housing the receiver portion of a remote car starter. The housing has a cavitated area adapted to securely retain the car starter receiver therein, a programmable timer, a power source, an on/off switch for arming/disarming the timer, a processor unit responsive to a signal from the timer, and a first actuator-in one form being a servomotor-for actuating, at the direction of the processor unit, the transmitter portion of the car starter. The processor unit is capable of being placed in a mode where it causes depression of the button twice, as some car-starter transmitters require such double-depression. In some embodiments, the invented device alternately or additionally comprises a dial-up sub-unit similar to a conventional "beeper" for receiving a telephonically-originated message. When such a message is received, instead of producing a beeping sound or a vibration, the dial-up sub-unit causes activation of the servomotor. Accordingly, upon being activated-via receiving a signal from either the timer or the dial-up sub-unit-the servomotor causes the depressing of a button on the transmitter portion of the remote car starter, thereby actuating the remote starter and starting the vehicle's engine.

The user of the invented apparatus places the transmitter portion of a remote car starter device inside the cavitated area, and sets the timer to activate the device at one or more times of the day. The user then places the apparatus, together with the transmitter inside, in the glove box or trunk of the car, where it is guaranteed to be in range of the receiver portion of the remote car starter. In this manner, the transmitter of the remote car starter is activated automatically so as to cause the car to automatically start at the pre-specified time(s) of the day.

In a still further embodiment, the invented apparatus receives and remembers, or "learns," the signal generated by the transmitter portion of the remote car starter device. Subsequently, the apparatus is placed, for example, in the glove box or trunk of the car, and at pre-set time(s) of the day, emits the learned signal, thus emulating the transmitter portion of the car starter device. In this embodiment, the transmitter portion of the car starter device need not be used to start the car after the invented apparatus learns its signal, and hence there is no cavitated area or servomotor, but instead a receiver (for receiving the transmitter's signal) and an emitter (for emitting the same signal at a later time). As with the servo-motor embodiments, this embodiment also optionally includes, in addition to the timer or instead of it, a dial-up sub-unit which, when it receives a telephonically-originated message, causes emission of the learned signal (instead of activation of the servomotor).

These and other aspects of the invention will be apparent from and elucidated with reference to the embodiments described hereinafter.

DETAILED DESCRIPTION OF THE INVENTION

Figure 1:
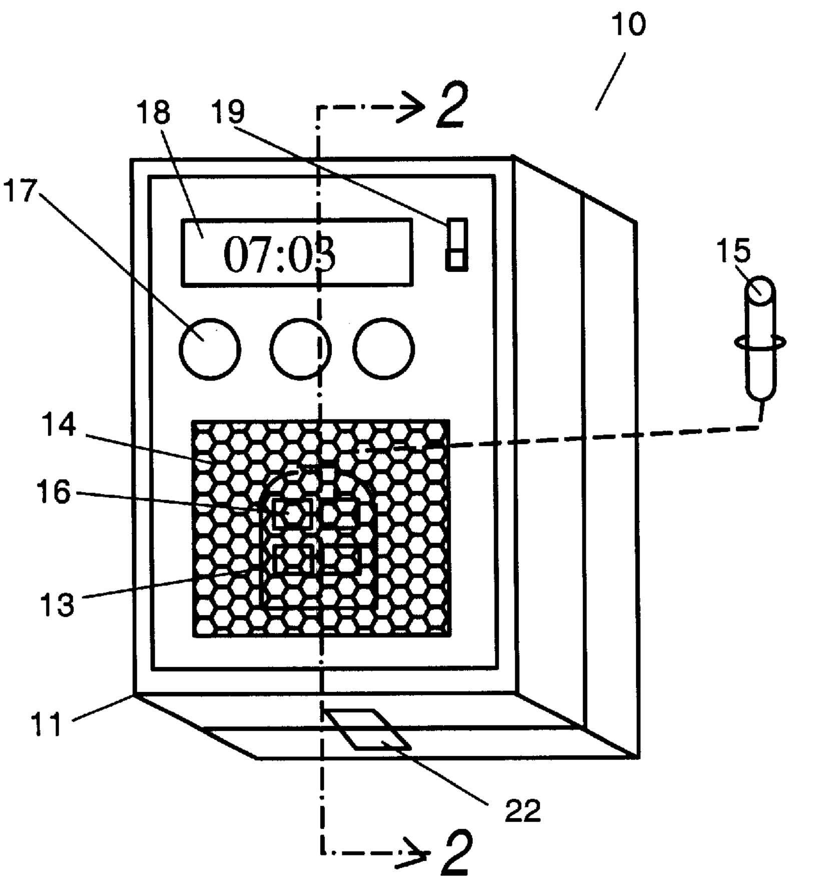
FIG. 1 shows, in isometric view, the preferred embodiment of the invented apparatus.

To assist in a better understanding of the present invention, a specific embodiment of the invention will now be described in detail. Although such is the preferred embodiment, it is to be understood that the invention can take other embodiments. After the preferred embodiment, several alternate embodiments are described. This detailed description of the invention will include reference to FIGS. 1 through 9. The same reference numerals will be used to indicate the same parts and locations in all the figures unless otherwise indicated. It will be apparent to one skilled in the art that the present invention may be practiced without some of the specific details described herein. In other instances, well-known structures and devices are shown in block diagram form.

A. Preferred Embodiment

Referring now to the drawings, there is shown a "smart car starter," that is, an apparatus according to the present invention which activates the transmitter portion of a commercial remote car starter at pre-specified times of the day, generally designated (10). FIG. 1 shows in isometric view the housing containing the timing apparatus as is hereinafter described, including one representative pin that the user positions in the activation panel.

Figure 2:
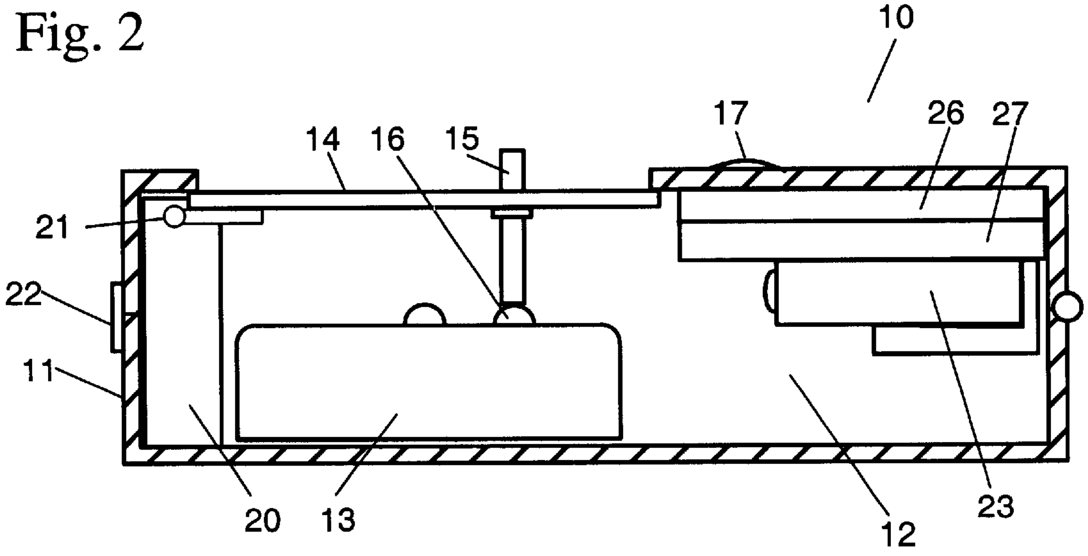
FIG. 2 shows, in cross-sectional view, the preferred embodiment of the invented apparatus.
Figure 3:
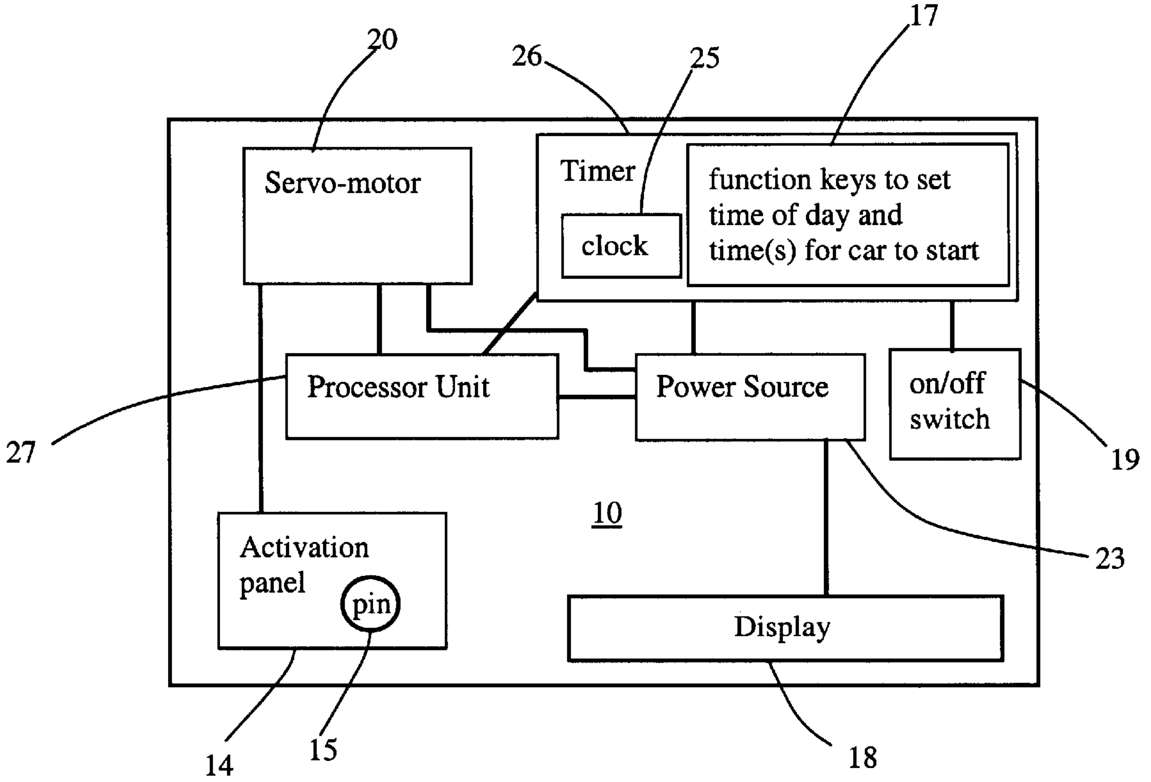
FIG. 3 shows, in schematic view, the preferred embodiment of the invented apparatus.

Referring to FIGS. 1–3, the preferred embodiment (10) of the invented apparatus includes: a housing (11) having a cavitated area (12) adapted to securely retain the transmitter portion (13) of a car starter; an activation panel (14) containing holes in a two-dimensional array for holding a one or more pins (15), each of which is pressed into a hole of the panel (14) opposite an activating means, such as a button (16), of the remote car starter transmitter (13); function keys (17) coupled to a timer (26); a display (18) which is preferably a liquid-crystal display, or LCD, for displaying time and timer settings; a power source (23) which is preferably a 4–6 volt battery; a switch (19) for arming/disarming (i.e., turning on or off) the timer (26); a servomotor (20) (or, less preferably, a solenoid) for depressing the activation panel (14); an arm (21) attached to the servomotor (20) so that when the servomotor (20) is activated and rotates, the arm translates that rotation into a depressing motion of the activation panel (14), thus causing automatic activation of the appropriate button(s) (16) on the transmitter portion (13) of the remote car starter; and a processor unit (27) which, in response to a signal from the timer (26), causes actuation of the servo-motor (20). In the preferred embodiment, there is also a latch (22) for holding the top half of the housing (11) together with the bottom half. Manifestly, the latch (22) is not needed in an embodiment in which alternate means are used for keeping the top and bottom halves of the housing (11) together while the remote car starter (13) remains inside.

The timer (26) includes a clock (25), as well as function keys (17) for the user to set the current time of day, as well as a time of day, or times of day, for the timer (26) to signal the processor unit (27) to cause activation of the servomotor (20). Disarming the timer (26) causes it to not make a signal, even at the pre-set time(s) of day. The clock portion (25) of the timer (26), however, preferably continues to keep the current time of day, so that when the timer (26) is re-armed, the user does not have to re-set the current time of day on the clock portion (25) of the timer (26).

It is to be noted that the processor unit (27) can be toggled between one and two depressions. If it is set to "single-depression" mode, upon receipt of the signal from the timer (26) it only causes the activation panel (14) to be depressed downward once, thus causing only one pushing (by one or more pins (15)) of the transmitter portion's (13) activation means (16). If the processor unit (27) is set to "double-depression mode", however, it causes two separate depressions of the activation panel (14). In this mode, the activation panel (14) is depressed a first time, thus causing a first pushing of the transmitter portion's (13) activation means (16). After this, the activation panel (14) is lifted, and then depressed a second time, thus causing a second pushing of the transmitter portion's (13) activation means (16). This is necessary in the case that the transmitter portion (13) of the remote car starter situated within the cavitated area (12) requires the user to push its activation means (13) (typcially, a button), two times for the car to start.

Figure 5:
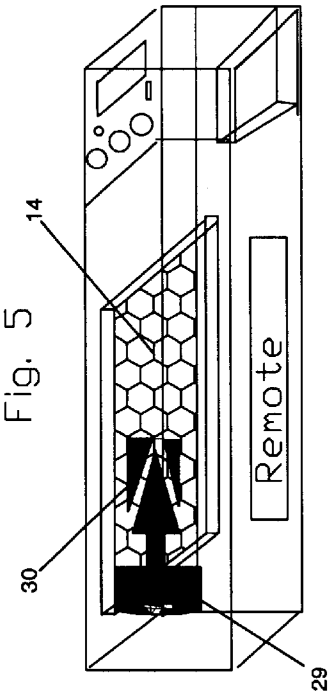
FIG. 5 shows an embodiment of the invented apparatus including a solenoid or servo that, when pushed or pulled across the top of the activation panel, depresses it for activation.
Figure 7:
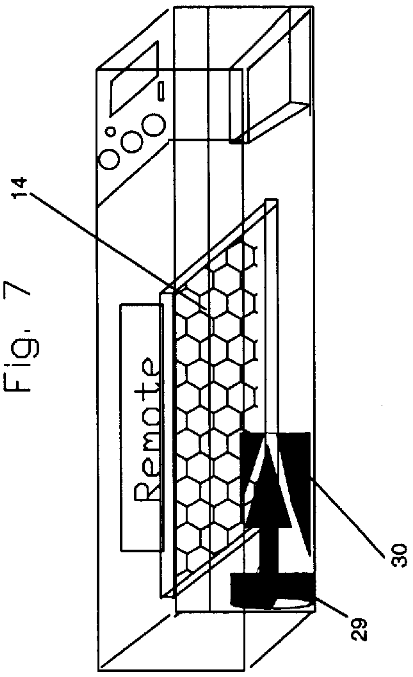
FIG. 7 shows an embodiment of the invented apparatus including a solenoid or servo that, when pushed or pulled across the bottom of the activation panel, raises it for activation.
Figure 4:
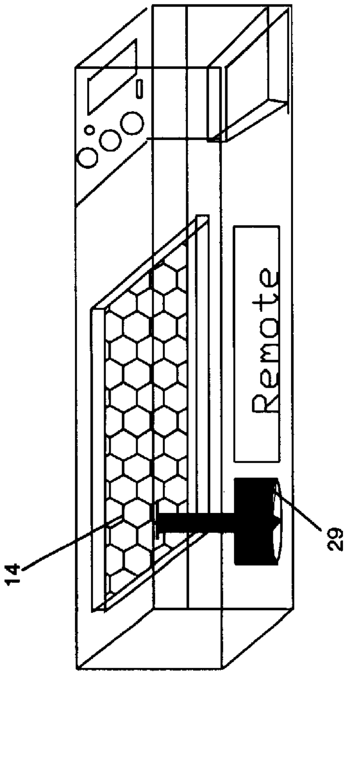
FIG. 4 shows an embodiment of the invented apparatus in which a servo or solenoid pulls down on the activation panel for activation.
Figure 6:
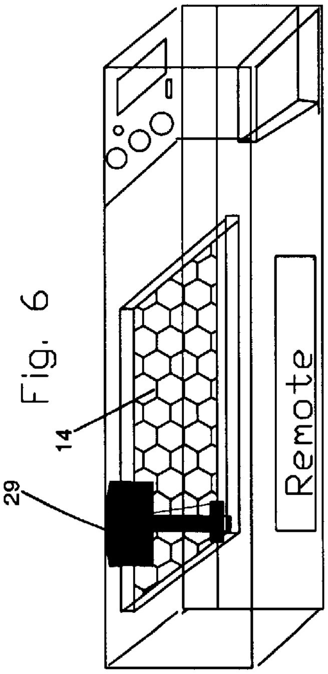
FIG. 6 shows an embodiment in which a servo or solenoid pushes down on the activation panel for activation.

FIGS. 4–7 show variations of the preferred embodiment that do not rely upon an arm to translate the servomotor's or solenoid's motion into a depressing motion of the activation panel (14). Instead, an actuator (29), such as a solenoid or servomotor, controls the movement of the activation panel (14) in a more direct manner. Referring to FIG. 4, actuator (29) pulls down upon activation panel (14), thus depressing it for activation. Referring to FIG. 5, actuator (29) travels across the top of activation panel (14), thus causing it to come into contact with substantially wedge-shaped member (30), which in turn causes depression of activation panel (14) for activation. Referring to FIG. 6, actuator (29) pushes down upon activation panel (14), thus depressing it for activation. Referring to FIG. 7, actuator (29) travels across the bottom of activation panel (14), thus causing it to come into contact with substantially wedge-shaped member (30), which in turn causes raising of activation panel (14) for activation.

B. Alternate Embodiment

Figure 8:
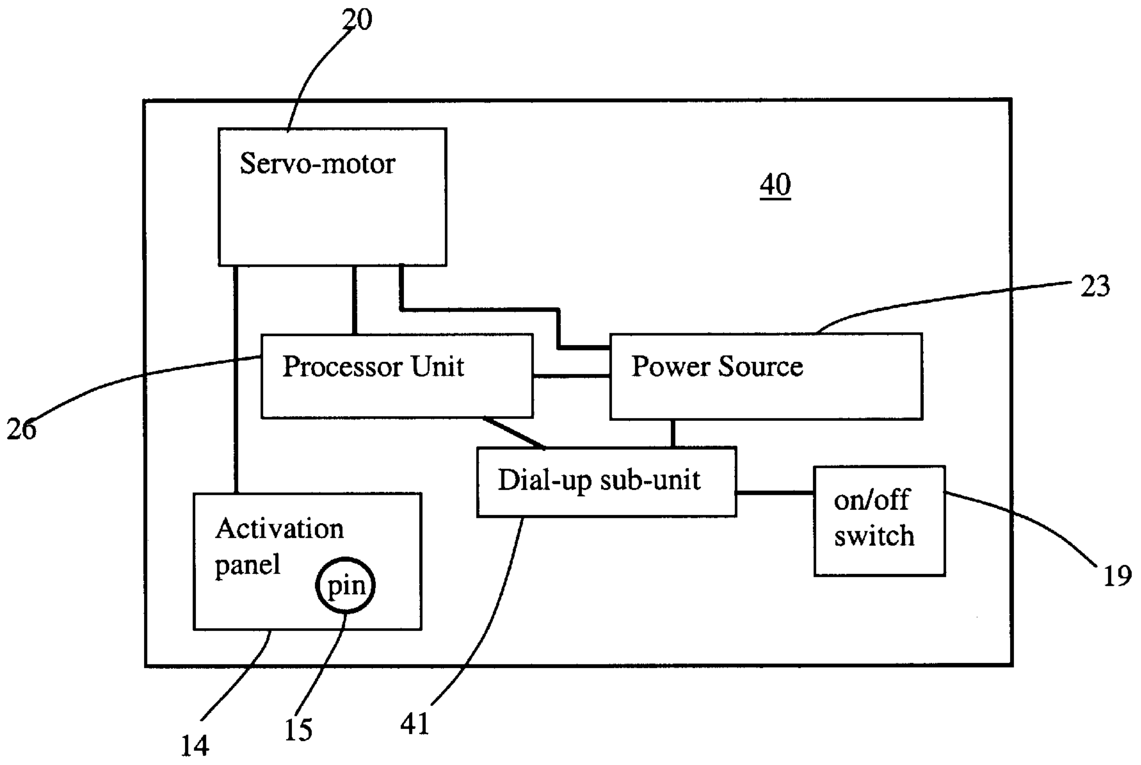
FIG. 8 shows, in schematic view, an alternate embodiment of the invented apparatus with a dial-up sub-unit.

Referring to FIG. 8, in an alternative embodiment (40), instead of including a timer the invented apparatus (40) includes a sub-unit (41) similar to a conventional beeper (hereinafter, the "dial-up sub-unit"), responsive to a radio-frequency signal. In this disclosure and in the claims that follow, the term "radio-frequency signal" indicates any wireless electromagnetic signal, and not just a signal inside the portions of the radio wave spectrum associated with actual radios.

As with a conventional beeper, the user causes such a signal to be transmitted to the dial-up sub-unit (41) by dialing a number on a telephone. The dial-up sub-unit (41) is coupled to a power source (23), preferably a 4–6 volt battery. The dial-up sub-unit (41) is coupled to a servomotor (20) (or, less preferably, a solenoid) for causing depression of the activation panel (14), as in the preferred embodiment described above. Accordingly, upon being energized, via receiving a radio-frequency signal, the dial-up sub-unit (41) causes the panel (14) to be depressed, by means of the servomotor (24), and one or more pins (15) within the panel press a button or buttons on the transmitter (not shown), thereby actuating the remote starter and starting the vehicle's engine. As with the timer-activated embodiment (10), the dial-up sub-unit embodiment (40) preferably has an on/off switch (19). In the present embodiment, such switch (19) is for arming/disarming the dial-up sub-unit instead of arming/disarming a timer.

Although the dial-up sub-unit (41) is described above as being substantially equivalent to a traditional "beeper," it is apparent to one of skill in the art that the dial-up sub-unit (41) can instead be based upon cellular telephonic technology. Thus, it can be similar to a cellular telephone, but upon receiving a "call," instead of ringing it causes activation of the servomotor (20). Similarly, instead of being based upon cellular phone technology, the dial-up sub-unit (41) can be based upon technology used in even more recent wireless communication systems, such as high-frequency personal communication systems. Accordingly, the term "dial-up sub-unit" is used herein in a generic sense to indicate any of the above types of wireless communication technology, or any similar technology, and not just traditional "beeper" type technology.

C. Combination Embodiment

A still further embodiment of the invented device combines the "timer" feature of the preferred embodiment with the "beeper" feature of the alternate embodiment described above. In such "combination embodiment," the invented device includes a timer and means for setting at least one time of day for the timer to cause activation of the servomotor. When the timer makes a signal, the activation panel is depressed by means described above, and the remote car starter's transmitter portion is activated so as to start the vehicle. Additionally, the combination device contains a beeper-like sub-unit so that the user can start the car on demand, by dialing an appropriate telephone number.

There are six possibilities for an on/off switch in the combination embodiment. 1) The device can have no on/off switch. 2) It can have one on/off switch that arms/disarms the timer only. 3) It can have one on/off switch that arms/disarms the beeper-like sub-unit only. 4) It can have one on/off switch that arms/disarms both the timer and the beeper-like sub-unit. 5) It can have two on/off switches, one that arms/disarms the timer, and the other that arms/disarms the beeper-like sub-unit. Finally 6) it can have one switch that toggles between the timer and the beeper-like sub-unit. Of the above six possibilities, number 5 is preferable, as it allows independent arming/disarming of each aspect of the device. Number 6 is least preferable as it does not allow both aspects of the device to be armed or disarmed simultaneously.

D. "Learning" Embodiment

A yet additional embodiment of the invented device does not rely upon the transmitter portion of the already-installed remote car starter for each start of the car. Rather, it "learns" the transmitter's signal, and then emits that signal at the appropriate time, thus functioning as a "smart" car starter even absent the transmitter portion of the already-installed remote car starter.

Figure 9:
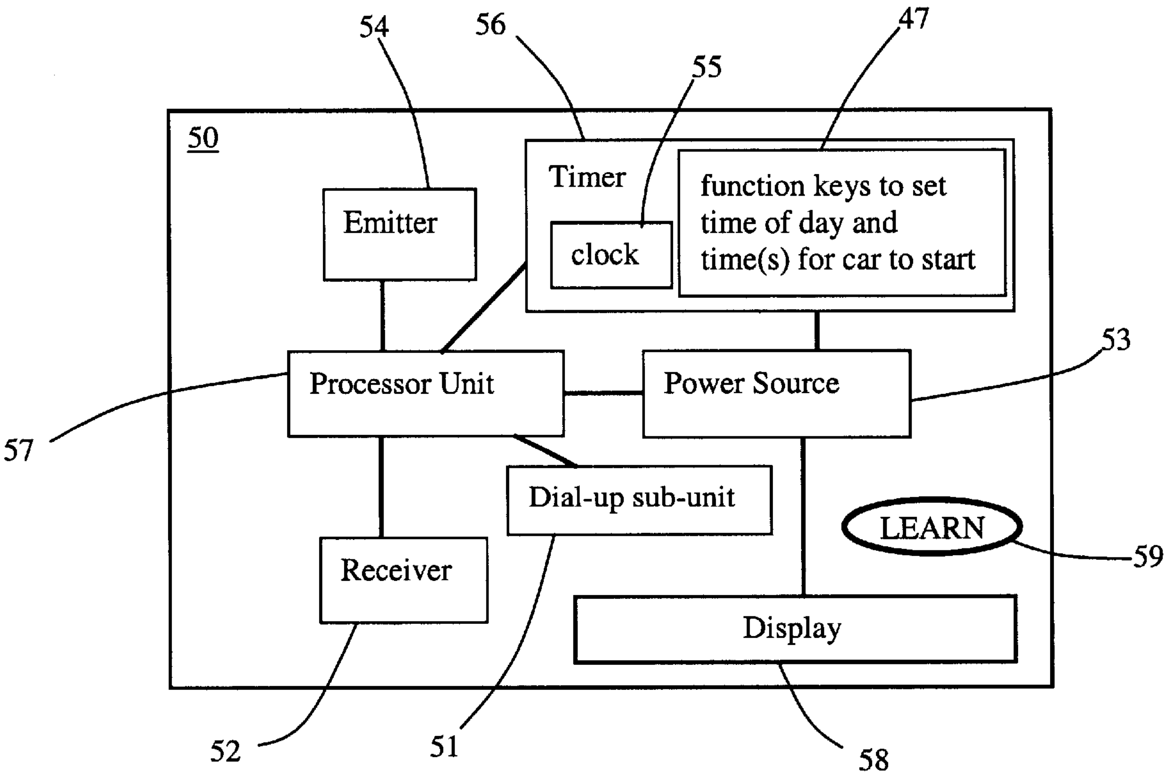
FIG. 9 shows, in schematic view, a "learning" embodiment of the invented apparatus.

Referring to FIG. 9, this embodiment (50) includes a power source (53) (preferably, a 4–6 volt battery), a processor unit (57), a receiver (52) for receiving a signal to learn, an emitter (54) for emitting the learned signal, a display (58) (preferably, a liquid crystal display), and a "learn" button (59) for placing the apparatus (50) into "learn mode." When the user presses the learn button (59), the processor unit (57) places the apparatus (50) into learn mode, meaning that it is ready to receive a signal and store it internally within its processor unit (57). While the apparatus (50) is in learn mode, the user points the transmitter portion of his or her existing, installed car starter at the apparatus (50), and presses the transmit button. The transmitter portion transmits the signal for causing the car to start, and the apparatus (50) receives this signal through its receiver (52). The receiver (52) then forwards the signal to the processor unit (57), which stores it by any means known to those skilled in the art. The user places the apparatus (50) anywhere in the vehicle, preferably in the trunk or glove box. Now that the apparatus (50) has learned the signal for starting the car and has stored it internally, the transmitter portion of the installed remote car starter is not needed: the apparatus (50) subsequently emits, through the emitter (54), the stored signal to start the car.

As with the above non-learning embodiments (10, 40), the present embodiment (50) is triggered to emit the start signal to the receiver portion of the installed car starter either by a timer (56) or by a telephonically-originated radio-frequency signal, which triggers a dial-up sub-unit (51), or both. Accordingly, the "learning" embodiment (50) includes, in addition to the components described above, either a timer (56) which can be set to make a signal at one or more pre-set time(s) of the day so as to cause emission of the stored car-start signal, or a dial-up sub-unit (51) responsive to a telephonically-originated electromagnetic signal, which in turn causes emission of the stored car-start signal, or both. The manner of incorporation of these components into the learning embodiment (50) is substantially the same as the manner of their incorporation into the non-learning embodiments described above.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. An apparatus for causing automatic activation of a transmitter portion of a remote car starter comprising:

a) a housing adapted to securely retain the transmitter portion;

b) a power source;

c) a first actuator operatively connected to a circuit including the power source;

d) a timer, connected to the circuit including the power source, having at least one programmable set point, such that when the timer reaches a set point, the first actuator is activated;

e) a second actuator operatively connected to the first actuator, whereby upon the first actuator being activated, the second actuator activates the transmitter portion f) an activation panel movably fitted within the housing, wherein the activation panel includes a plurality of holes each for holding a pin; and g) at least one pin inserted into a hole of the activation panel, such that when the second actuator is activated, the activation panel is moved to force the at least one pin to depress an activator of the transmitter portion.

2. The apparatus of claim 1 wherein the housing has a cavitated area.

3. The apparatus of claim 1 wherein the timer comprises:

a) a clock;

b) function keys for setting the clock's current time and the at least one set point; and c) a display for use in setting the clock's current time and the at least one set point.

4. The apparatus of claim 1 wherein the first actuator is selected from the group consisting of a servomotor and a solenoid.

5. The apparatus of claim 1 wherein the first actuator, upon being activated, rotates.

6. The apparatus of claim 5 wherein the first actuator is substantially cam shaped, such that its rotating motion is translated into a depressing motion of the second actuator.

7. The apparatus of claim 5 further comprising an arm operatively connecting the first actuator to the second actuator, which translates the rotating motion of the first activator into a depressing motion of the second actuator.

8. The apparatus of claim 5 wherein the first actuator, upon being activated, pulls the second actuator to cause activation of the transmitter portion.

9. The apparatus of claim 1 further comprising a substantially wedge-shaped member connected to the second actuator, wherein the first actuator, upon being activated, travels across the top of the second actuator and comes into contact with the substantially wedge-shaped member, thus causing depression of the second actuator to cause activation of the transmitter portion.

10. The apparatus of claim 1 wherein the first actuator, upon being activated, pushes the second actuator to cause activation of the transmitter portion.

11. The apparatus of claim 1 further comprising a substantially wedge-shaped member connected to the second actuator, wherein the first actuator, upon being activated, travels across the bottom of the second actuator and comes into contact with the substantially wedge-shaped member, thus causing raising of the second actuator to cause activation of the transmitter portion.

12. The apparatus of claim 1 further comprising a switch for arming and disarming the timer.

13. The apparatus of claim 1 further comprising a dial-up sub-unit responsive to a telephonically-originated radio frequency signal, connected to a circuit including the power source, such that when the dial-up sub-unit receives the telephonically-originated radio frequency signal, the first actuator is activated.

14. The apparatus of claim 13 wherein the dial-up sub-unit is a device selected from the group consisting of a beeper device, a cellular telephone device, and a personal communication system digital communication device.

15. The apparatus of claim 13 further comprising a switch for arming and disarming the dial-up sub-unit.

16. An apparatus for causing automatic activation of a transmitter portion of a remote car starter comprising:

a) a housing adapted to securely retain the transmitter portion;

b) a power source;

c) a first actuator operatively connected to a circuit including the power source;

d) a dial-up sub-unit responsive to a telephonically-originated radio frequency signal, connected to the circuit including the power source, such that when the dial-up sub-unit receives the telephonically-originated radio frequency signal, the first actuator is activated;

e) a second actuator operatively connected to the first actuator, whereby upon the first actuator being activated, the second actuator activates the transmitter portion f) an activation panel movably fitted within the housing, wherein the activation panel includes a plurality of holes each for holding a pin; and g) at least one pin inserted into a hole of the activation panel, such that when the second actuator is activated, the activation panel is moved to force the at least one pin to depress an activator of the transmitter portion.

17. The apparatus of claim 16 wherein the housing has a cavitated area.

18. The apparatus of claim 16 wherein the dial-up sub-unit is a device selected from the group consisting of a beeper device, a cellular telephone device, and a personal communication system digital communication device.

19. The apparatus of claim 16 wherein the first actuator is selected from the group consisting of a servomotor and a solenoid.

20. The apparatus of claim 16 further comprising an arm operatively connecting the first actuator to the second actuator.

21. The apparatus of claim 16 wherein the first actuator, upon being activated, rotates.

22. The apparatus of claim 21 wherein the first actuator is substantially cam shaped, such that its rotating motion is translated into a depressing motion of the second actuator.

23. The apparatus of claim 21 further comprising an arm operatively connecting the first actuator to the second actuator, which translates the rotating motion of the first activator into a depressing motion of the second actuator.

24. The apparatus of claim 16 wherein the first actuator, upon being activated, pulls the second actuator to cause activation of the transmitter portion.

25. The apparatus of claim 16 further comprising a substantially wedge-shaped member connected to the second actuator, wherein the first actuator, upon being activated, travels across the top of the second actuator and comes into contact with the substantially wedge-shaped member, thus causing depression of the second actuator to cause activation of the transmitter portion.

26. The apparatus of claim 16 wherein the first actuator, upon being activated, pushes the second actuator to cause activation of the transmitter portion.

27. The apparatus of claim 16 further comprising a substantially wedge-shaped member connected to the second actuator, wherein the first actuator, upon being activated, travels across the bottom of the second actuator and comes into contact with the substantially wedge-shaped member, thus causing raising of the second actuator to cause activation of the transmitter portion.

28. The apparatus of claim 16 further comprising a switch for arming and disarming the dial-up sub-unit.

29. A method for starting a car having an apparatus for learning an indicator from a transmitter portion of a remote car starter and subsequently emitting the indicator to a receiver portion of the remote car starter, comprising the steps of:

a) placing the apparatus in learn mode, the apparatus comprising:
   i) a power source;
   ii) a processor unit coupled to a circuit including the power source;
   iii) a receiver for receiving the indicator from the transmitter portion;
   iv) an emitter, connected to the circuit including the power source, for emitting the indicator; and
   v) a timer, connected to the circuit including the power source, having at least one programmable time set point, such that when the timer reaches a time set point, the emitter emits the indicator;

b) pointing a transmitting potion of the car starter at the apparatus, wherein the transmitter portion transmits the indicator for causing the car to start such that the apparatus receives the indicator through its receiver and forwards the indicator to its processing unit;

c) placing the apparatus anywhere in the car; and d) triggering the apparatus to emit a starting indicator to the receiver portion of the car starter by a timer, or telephonically originated radio frequency signal.

30. The method of claim 29, wherein the timer of the apparatus comprises:

a) a clock;

b) function keys for setting the clock's current time and the at least one set point; and c) a display for use in setting the clock's current time and the at least one set point.

31. The method of claim 29, wherein the apparatus further comprises a switch for arming and disarming the timer.

32. The method of claim 29, wherein the apparatus further comprises a dial-up sub-unit responsive to telephonically-originated radio frequency signals, connected to the circuit including the power source, such that when the dial-up sub-unit receives the telephonically-originated radio frequency signal, the emitter emits the indicator.

33. The method of claim 32, wherein the dial-up sub-unit is a device selected from the group consisting of a beeper device, a cellular telephone device, and a personal communication system digital communication device.

34. The method of claim 32, further comprising a switch for arming and disarming the dial-up sub-unit.

* * * * *